(12) United States Patent
Li

(10) Patent No.: US 11,119,352 B2
(45) Date of Patent: Sep. 14, 2021

(54) COLOR FILTER SUBSTRATE AND MANUFACTURING METHOD THEREOF

(71) Applicant: TCL China Star Optoelectronics Technology Co., Ltd., Guangdong (CN)

(72) Inventor: Fei Li, Guangdong (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/616,484

(22) PCT Filed: Aug. 13, 2019

(86) PCT No.: PCT/CN2019/100324
§ 371 (c)(1),
(2) Date: Nov. 24, 2019

(87) PCT Pub. No.: WO2020/228156
PCT Pub. Date: Nov. 19, 2020

(65) Prior Publication Data
US 2020/0409210 A1 Dec. 31, 2020

(30) Foreign Application Priority Data
May 14, 2019 (CN) .......................... 201910398414.7

(51) Int. Cl.
*G02F 1/1335* (2006.01)

(52) U.S. Cl.
CPC .. *G02F 1/133516* (2013.01); *G02F 1/133512* (2013.01)

(58) Field of Classification Search
CPC ......... G02F 1/133512; G02F 1/133514; G02F 1/133516
See application file for complete search history.

(56) References Cited

U.S. PATENT DOCUMENTS

2006/0222970 A1* 10/2006 Kobayashi ............. G02B 5/223
430/7
2008/0068540 A1  3/2008 Kang et al.
2016/0124262 A1* 5/2016 Wu .................. G02F 1/133502
349/110
(Continued)

FOREIGN PATENT DOCUMENTS

CN        102707565 A * 10/2012 ............... G03F 7/16
CN        104090419 A   10/2014
(Continued)

*Primary Examiner* — Jessica M Merlin

(57) ABSTRACT

A color filter substrate and a manufacturing method thereof are provided. The manufacturing method of the color filter substrate includes forming a patterned photoresist layer on a base substrate, in which the photoresist layer includes a plurality of first grooves and a plurality of second grooves, and both the first grooves and the second grooves expose the base substrate; roughening the base substrate to roughen bottom surfaces of the first grooves and bottom surfaces of the second grooves; and forming a black matrix layer on the base substrate, in which the black matrix layer is disposed on the first rough surfaces and the second rough surfaces.

16 Claims, 4 Drawing Sheets

(56) References Cited

U.S. PATENT DOCUMENTS

| | | | |
|---|---|---|---|
| 2016/0306225 A1 | 10/2016 | Zhang et al. | |
| 2017/0205650 A1* | 7/2017 | Ahn | H01L 27/124 |
| 2017/0242167 A1* | 8/2017 | Jia | G02B 1/14 |
| 2017/0261848 A1 | 9/2017 | Tang | |
| 2019/0355757 A1 | 11/2019 | Cao | |

FOREIGN PATENT DOCUMENTS

| | | | |
|---|---|---|---|
| CN | 104297978 A | 1/2015 | |
| CN | 104749816 A | 7/2015 | |
| CN | 105259694 A | 1/2016 | |
| CN | 107340626 A | 11/2017 | |
| CN | 108333830 A | 7/2018 | |
| CN | 109407431 A | 3/2019 | |

* cited by examiner

COLOR FILTER SUBSTRATE AND MANUFACTURING METHOD THEREOF

FIELD OF INVENTION

The present application relates to a display technology, and more particularly to a color filter substrate and a manufacturing method thereof.

BACKGROUND OF INVENTION

Liquid crystal display panels are generally composed of color filters (CF) base substrate, array substrates, liquid crystals disposed between the color filter substrate and the array substrate, and sealants. Color filter on array (COA) technology is an integration technique that directly produces a color filter layer on an array substrate, which can effectively solve light leakage problems caused by alignment deviations between color resists of the color filters and pixel electrodes in assembling processes and can significantly increase aperture ratio of display pixels and reduce parasitic capacitance. Therefore, COA technology has become a mainstream technology. Black matrixes (BM) are disposed on the CF base substrates. Main functions of black matrixes are to shield the light leakages of pixel designs caused by differences of pixel arrangements, increase contrast of the color filters, and prevent mixing of colors between different colors of pixels so as to increase color purity.

However, reflectivity of the color filter substrate of the display panels made by the COA technology is large. Contrast of the display panels are thus reduced. In particular, as the development of 8K technologies, area ratio of black matrixes is further increased which increases the reflectivity caused by the black matrixes and thus seriously affects display quality.

SUMMARY OF INVENTION

An embodiment of the present application provides a color filter substrate and a manufacturing method thereof and to solve a technical problem that light reflectivity of an interface between a black matrix of a color filter and a base substrate of conventional display panels is large.

An embodiment of the present application provides a manufacturing method of a color filter substrate, comprising steps of:

providing a base substrate;

forming a patterned photoresist layer on the base substrate, wherein the photoresist layer comprises a plurality of first grooves, a plurality of second grooves, and a plurality of photoresist structures, both the first grooves and the second grooves expose the base substrate, the first grooves are spaced apart from each other along a first direction, the second grooves are spaced apart from each other along a second direction, the first grooves and the second grooves intersect to form a plurality of photoresist regions, and the photoresist structures are disposed within the photoresist regions;

roughening the base substrate to roughen bottom surfaces of the first grooves and bottom surfaces of the second grooves to form first rough surfaces and second rough surfaces, respectively;

forming a black matrix layer on the base substrate, wherein the black matrix layer is disposed on the first rough surfaces and the second rough surfaces; and removing the photoresist layer;

wherein a material of the photoresist layer is a hydrophobic material and a material of the black matrix layer is a black ink material; and wherein in the step of roughening the base substrate, the base substrate is roughened with a strong acid or a strong base.

In the manufacturing method of the color filter substrate of the present application, wherein the black matrix layer is formed by inkjet printing.

In the manufacturing method of the color filter substrate of the present application, wherein a viscosity of the black ink material is less than 10 cps.

In the manufacturing method of the color filter substrate of the present application, wherein the strong acid is a hydrofluoric acid solution, and the strong base is a sodium hydroxide solution.

In the manufacturing method of the color filter substrate of the present application, wherein the photoresist layer is formed by a photolithography process.

In the manufacturing method of the color filter substrate of the present application, wherein a height of the black matrix layer is less than or equal to a height of the photoresist layer.

An embodiment of the present application further provides a manufacturing method of a color filter substrate, comprising steps of:

providing a base substrate;

forming a patterned photoresist layer on the base substrate, wherein the photoresist layer comprises a plurality of first grooves, a plurality of second grooves, and a plurality of photoresist structures, both the first grooves and the second grooves expose the base substrate, the first grooves are spaced apart from each other along a first direction, the second grooves are spaced apart from each other along a second direction, the first grooves and the second grooves intersect to form a plurality of photoresist regions, and the photoresist structures are disposed within the photoresist regions;

roughening the base substrate to roughen bottom surfaces of the first grooves and bottom surfaces of the second grooves to form first rough surfaces and second rough surfaces, respectively;

forming a black matrix layer on the base substrate, wherein the black matrix layer is disposed on the first rough surfaces of the first grooves and the second rough surfaces of the second grooves; and removing the photoresist layer.

In the manufacturing method of the color filter substrate of the present application, wherein a material of the photoresist layer is a hydrophobic material, and a material of the black matrix layer is a black ink material.

In the manufacturing method of the color filter substrate of the present application, wherein the black matrix layer is formed by inkjet printing.

In the manufacturing method of the color filter substrate of the present application, wherein a viscosity of the black ink material is less than 10 cps.

In the manufacturing method of the color filter substrate of the present application, wherein in the step of roughening the base substrate, the base substrate is roughened with a strong acid or a strong base.

In the manufacturing method of the color filter substrate of the present application, wherein the strong acid is a hydrofluoric acid solution, and the strong base is a sodium hydroxide solution.

In the manufacturing method of the color filter substrate of the present application, wherein the photoresist layer is formed by a photolithography process.

In the manufacturing method of the color filter substrate of the present application, wherein a height of the black matrix layer is less than or equal to a height of the photoresist layer.

The present application further relates to a color film base substrate, comprising:

a base substrate comprising a plurality of first rough surfaces and a plurality of second rough surfaces, wherein the first grooves are spaced apart from each other along a first direction, the second grooves are spaced apart from each other along a second direction, and the first rough surfaces and the second rough surfaces are disposed to intersect each other; and a black matrix layer disposed on the first rough surfaces and the second rough surfaces.

In the color filter substrate of the present application, wherein the black matrix layer defines a pore structure in the black matrix layer, and wherein the pore structure comprises an air space and a protective layer encapsulating the air space.

Compared with color film base substrates of the display panels of the prior art, the color film base substrate of the present application and the manufacturing method thereof increase a roughness of an interface between the black matrix layer and the substrate by performing a surface-roughening treatment on an area of the base substrate where a black matrix is disposed on. Reflectivity of the interface is thus reduced. The color film base substrate of the present application and the manufacturing method thereof solve the technical problem that light reflectivity of an interface between a black matrix of a color filter and a base substrate of conventional display panels is large.

DESCRIPTION OF DRAWINGS

In order to illustrate technical solutions in the embodiments of the present application or in the prior art more clearly, the accompanying drawings required in the embodiments are introduced briefly hereafter. The accompanying drawings in the following description are merely part of the embodiments of the present application. Based upon the accompanying drawings, people with ordinary skills in the art can obtain other drawings without making inventive efforts.

DETAILED DESCRIPTION OF PREFERRED EMBODIMENTS

Figure 1:
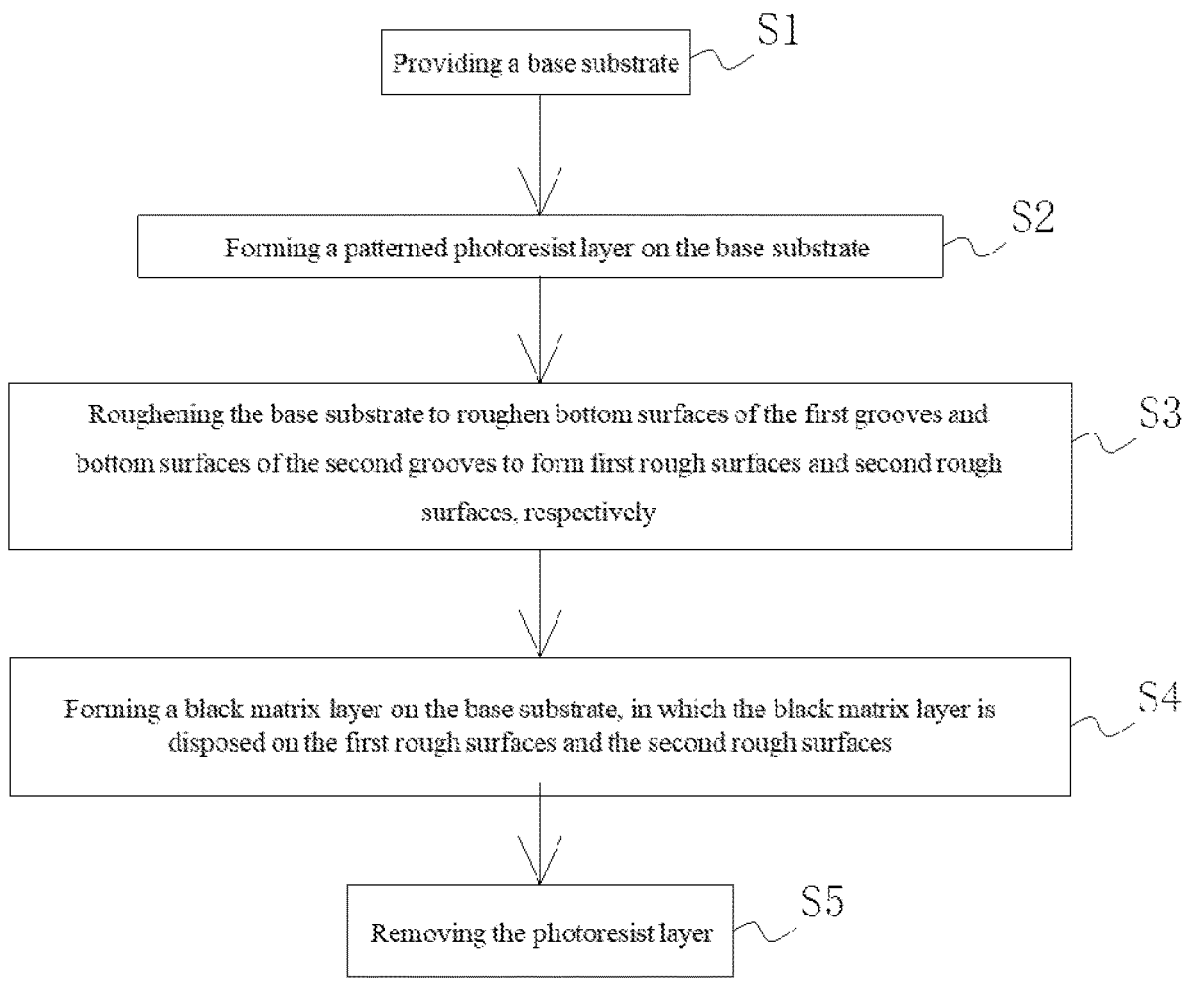
FIG. 1 is a schematic flowchart of a manufacturing method of a color filter substrate according to an embodiment of the present application.

Referring to the drawings in the accompanying drawings, same reference numerals represent same components. The following description is based on the detailed embodiments of the present invention as exemplified, and should not be construed as a limitation to other embodiments of the present application which are not described herein in detail.

Figure 2:
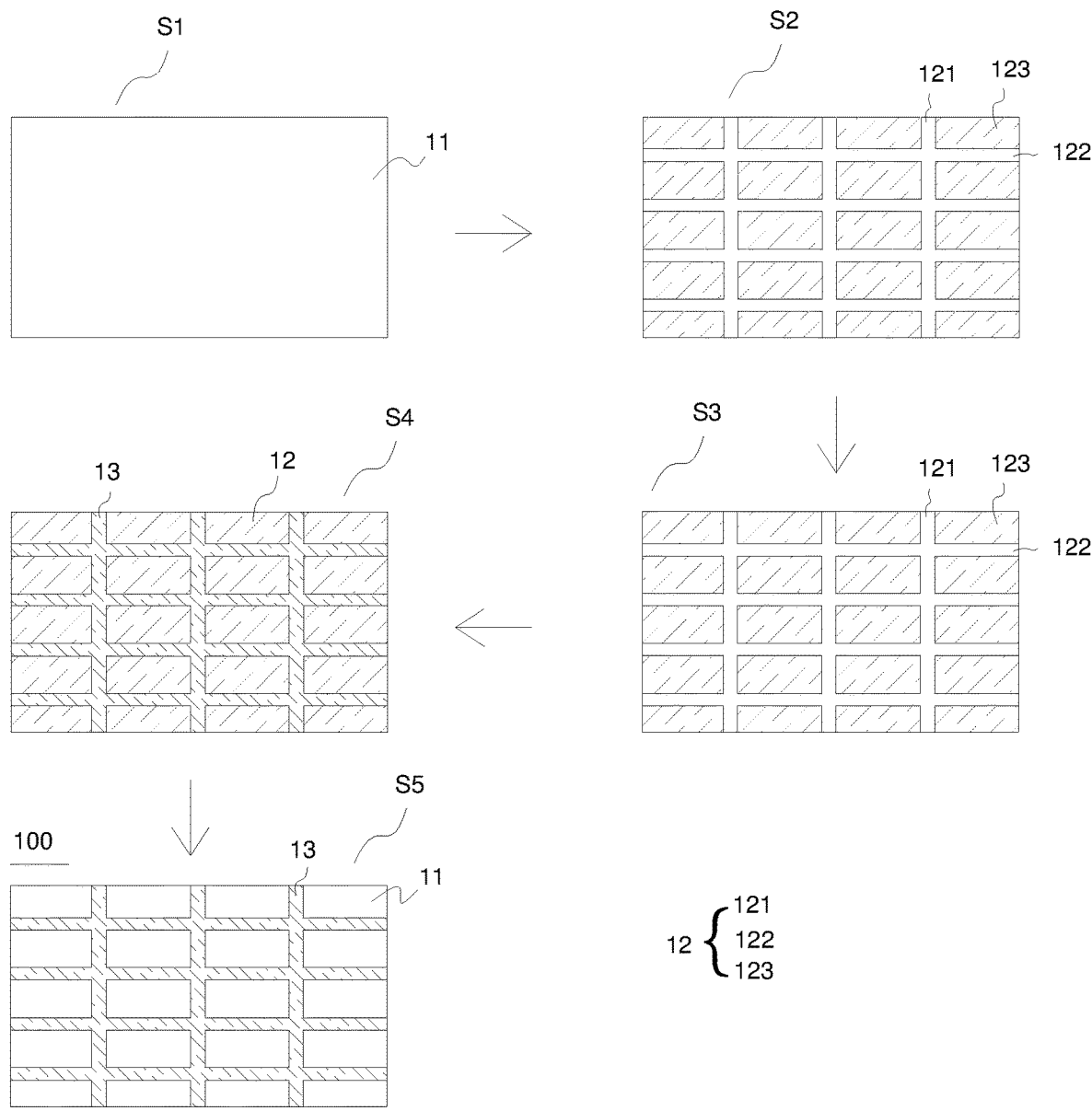
FIG. 2 is another schematic flowchart of a manufacturing method of a color filter substrate according to an embodiment of the present application.

Please refer to FIG. 1 and FIG. 2. FIG. 1 is a schematic flowchart of a manufacturing method of a color filter substrate according to an embodiment of the present application. FIG. 2 is another schematic flowchart of a manufacturing method of a color filter substrate according to an embodiment of the present application. It is noted that, in the color filter substrate of the present application, the color filter substrate can be a first type: the color film base substrate includes a black matrix layer and a color film layer. The color film layer includes a red photoresist unit, a green photoresist unit, and a blue photoresist unit. In addition, the color film base substrate may also be a second type: a color film base substrate that apply a COA technology for liquid crystal display panels. The color film base substrate includes a black matrix layer, i.e., a color film layer is formed on the array substrate. The manufacturing method of the color filter substrate according to an embodiment of the present application is described using the second type as an example, but the manufacturing method is not limited thereto.

A manufacturing method of a color filter substrate according to an embodiment of the present application includes, a step S1 of providing a base substrate 11;

a step S2 of forming a patterned photoresist layer 12 on the base substrate 11, in which the photoresist layer 12 includes a plurality of first groove 121, a plurality of second groove 122, and a plurality of photoresist structures 123, both the first groove 121s and the second grooves 122 expose the base substrate 11, the first grooves 121 are spaced apart from each other along a first direction, the second groove 122 are spaced apart from each other along a second direction, the first grooves 121 and the second grooves 122 intersect to form a plurality of photoresist regions, and the photoresist structures 123 are disposed within the photoresist regions;

a step S3 of roughening the base substrate 11 to roughen bottom surfaces of the first grooves 121 and bottom surfaces of the second grooves 122 to form first rough surfaces and second rough surfaces, respectively;

a step S4 of forming a black matrix layer 13 on the base substrate 11, in which the black matrix layer 13 is disposed on the first rough surfaces and the second rough surfaces; and a step S5 of removing the photoresist layer 12.

The manufacturing method of the color filter substrate 10 according to the embodiment of the present application increases roughness of an interface between the black matrix layer 13 and the base substrate 11 by performing a surface-roughening treatment on an area of the base substrate 11 where a black matrix 13 is disposed on. Reflectivity of the interface is thus reduced.

For the steps of the manufacturing method of the color filter substrate 100 according to the embodiment of the present application, please refer to the following specific contents.

A step S1 of providing a base substrate 11. The base substrate 11 can be a rigid base substrate and can be a flexible base substrate, such as a glass base substrate and a polyimide film. A step S2 is proceeded after completing the step S1.

The step S2 of forming a patterned photoresist layer 12 on the base substrate 11.

The photoresist layer 12 is formed by a photolithography process. The photoresist layers 12 are arranged in an array.

Specifically, the photoresist layer 12 includes a plurality of first grooves 121, a plurality of second grooves 122, and a plurality of photoresist structures 123. Both the first grooves 121 and the second grooves 122 expose the base substrate 11. The first grooves 121 are spaced apart from each other along a first direction. The second grooves 122 are spaced apart from each other along a second direction. The first direction is perpendicular to the second direction. The first grooves 121 and the second grooves 122 intersect to form a plurality of photoresist regions. The photoresist structure 123 is disposed within the photoresist regions. The photoresist structures 123 are in block shapes.

A material of the photoresist layer 12 is a hydrophobic material. When the photoresist layer 12 is made of a hydrophobic material, a surface of the photoresist structure 123 of the photoresist layer 12 is weakened to a liquid material, i.e., the liquid material does not condense to a certain extent on the surface of the photoresist structure 123, which facilitates autonomous flow and extension of the liquid material. It is understood that the material of the photoresist layer 12 can also be a hydrophilic material, which is not limited in the present embodiment. A step S3 is proceeded after completing the step S2.

The step S3 of roughening the base substrate 11 to roughen bottom surfaces of the first grooves 121 and bottom surfaces of the second grooves 122 to form first rough surfaces and second rough surfaces, respectively.

Specifically, the base substrate 11 is roughened with a strong acid or a strong base. The strong acid is a hydrofluoric acid solution, sulfuric acid, nitric acid, etc. The strong base is a sodium hydroxide solution, potassium hydroxide, etc. Due to an effect of the photoresist structure 123, the strong acid or strong base solution does not corrode an area of the base substrate 11 where the photoresist structures 123 are disposed on. Therefore, the strong acid or the strong base corrodes the bottom surfaces of the first grooves 121 and the bottom surfaces of the second grooves 122, i.e., the exposed area of the base substrate 11, so that a surface of the area of the base substrate 11 corresponding to the first grooves 121 and the second grooves 122 is corroded to form a rough surface. The bottom surfaces of the first grooves 121 are the first rough surfaces and the bottom surfaces of the second grooves 122 are second rough surfaces. A roughness of the first rough surfaces and a roughness of the second rough surfaces may be the same or different from each other.

The formation of the rough surface on the base substrate 11 disrupts the bonding interface between the black matrix layer 13 and the base substrate 11, thereby increasing the roughness of the interface therebetween. When an external light illuminates the interface, a scattering effect is produced, which reduces the reflectivity of the interface.

In some embodiments, the bottom surfaces of the first grooves are the first rough surfaces and the bottom surfaces of the second grooves are the second rough surfaces. The roughness of the first rough surfaces and the roughness of the second rough surfaces are different. The difference of the roughness therebetween causes that a scattering effect of the first rough surfaces and a scattering effect the second rough surfaces to light are different. That is to say, the present embodiment can adjust different roughness according to different requirements.

Processes of forming the first rough surfaces and the second rough surfaces are, first, forming a first photoresist layer on the base substrate. The first photoresist layer includes a plurality of first photoresist structures and a plurality of first grooves. The adjacent photoresist structures are spaced from each other by the first grooves. The first grooves are arranged along a first direction. Then, performing a first roughening treatment on a surface of the base substrate to convert the bottom surfaces of the first grooves into first rough surfaces.

Subsequently, the first photoresist layer is cut or etched to form a second photoresist layer and the first photoresist structures are cut or etched into a plurality of second photoresist structures. The second photoresist layer includes second grooves. Two adjacent second photoresist structures are spaced from each other by the second grooves. The second grooves are arranged along a second direction. Finally, the base substrate is subjected to a second roughening treatment to convert the bottom surfaces of the second grooves into the second rough surfaces.

Because the bottom surfaces of the first grooves are corroded twice, the roughness of the first rough surfaces is greater than the roughness of the second rough surfaces.

A step S4 is proceeded after the step S3 is completed.

The step S4 of forming a black matrix layer 13 on the base substrate 11. The black matrix layer 13 is disposed on the first rough surfaces and the second rough surfaces, i.e., the black matrix layer 13 is formed within the first grooves 121 and the second grooves 122.

Specifically, a material of the black matrix layer 13 is a black ink material. A viscosity of the black ink material is less than 10 cps. Optionally, a viscosity of the black ink material is 7 cps. The black matrix layer is formed by inkjet printing.

In the step S4, the black ink material is printed within the first grooves 121 and the second grooves 122 by inkjet printing. Because the photoresist layer 12 is made of a hydrophobic material, sidewalls of the first grooves 121 and the second grooves 122 are hydrophobic. When the black ink material is disposed on the surface of the first grooves 121 and the second grooves 122, the black ink material automatically flows between the first grooves 121 and the second grooves 122 without being condensed on the surfaces of the first grooves 121 and the surfaces of the second grooves 122. Furthermore, because the black ink material in the first grooves 121 and the second grooves 122 possesses characteristic of autonomous flowing towards the grooves, the black ink material possesses a function of self-alignment, i.e., the black ink material automatically flows from one groove to another groove and gradually fills all the grooves. Therefore, the black ink material is prevented from being printed on the photoresist structure 123 due to tolerance, so that the black ink material is condensed on the photoresist structure 123.

Top surfaces of the photoresist structures 123 facing away from the base substrate 11 is smoothly connected to side surfaces of the photoresist structures 123 via arc surfaces so that the black ink material dripping to a periphery of the photoresist structures 123 flows into the grooves under effect of gravity and the arc surfaces.

In addition, a height of the black matrix layer 13 is less than or equal to a height of the photoresist layer 12.

In some embodiments, the material of the black matrix layer further includes a particle structure that is mixed into the black ink material. The particle structure includes a mixture and a protective layer encapsulating the mixture. The mixture includes a polypropylene carbonate resin and a photoacid generator.

A step S5 is processed after the step S4 is completed.

The step S5 of removing the photoresist layer 12. Specifically, the photoresist layer 12 is removed using a developer and only the black matrix layer 13 is remained.

In some embodiments, the method further includes a step of subjecting the black matrix layer 13 to ultraviolet light irradiation and heat treatment. Ultraviolet light is applied to reduce temperature requirements for thermal decomposition of the particle structure. The heat treatment causes the particle structure to be thermally decomposed into a gas. Specifically, all of the polypropylene carbonate resin of the particle structure is thermally decomposed into a gas, so that all the particle structures become a pore structure. Because the pore structure is filled with a gas, a refractive index of the pore structure is close to a refractive index of air. For the black matrix layer as a whole, the pore structure affects a refractive index of the black matrix layer and reduces the refractive index of the black matrix layer as a whole, thereby reducing the reflectivity of the interface between the black matrix layer and the base substrate. For a structure after the black matrix layer is formed subsequent to this step, reference can be made to a structure of the color filter substrate below.

The manufacturing processes of the color filter substrate 100 according to an embodiment of the present application is thus completed.

Figure 3:
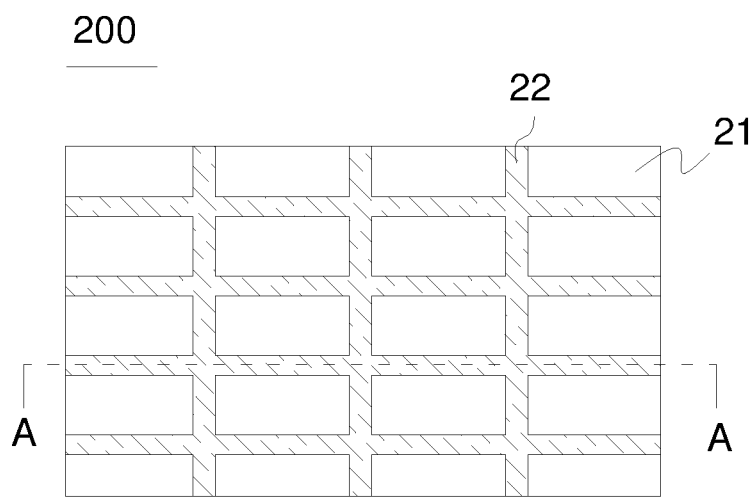
FIG. 3 is a schematic structural view of a color filter substrate according to an embodiment of the present application.
Figure 4:
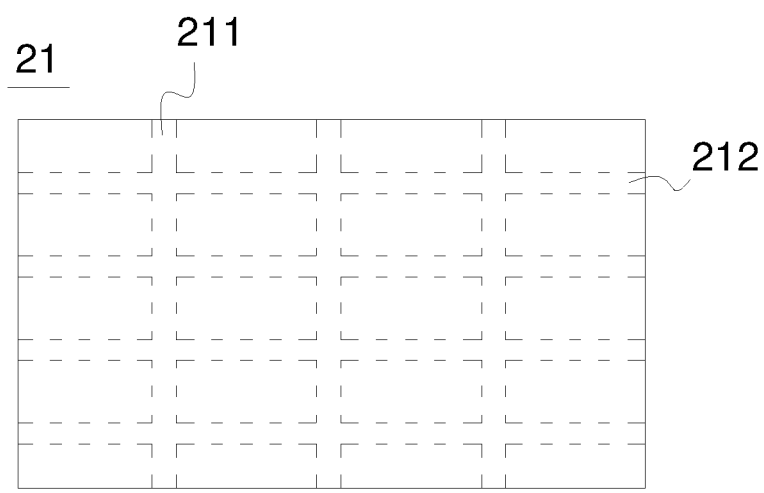
FIG. 4 is a schematic structural view of a base substrate of a color filter substrate according to an embodiment of the present application.
Figure 5:
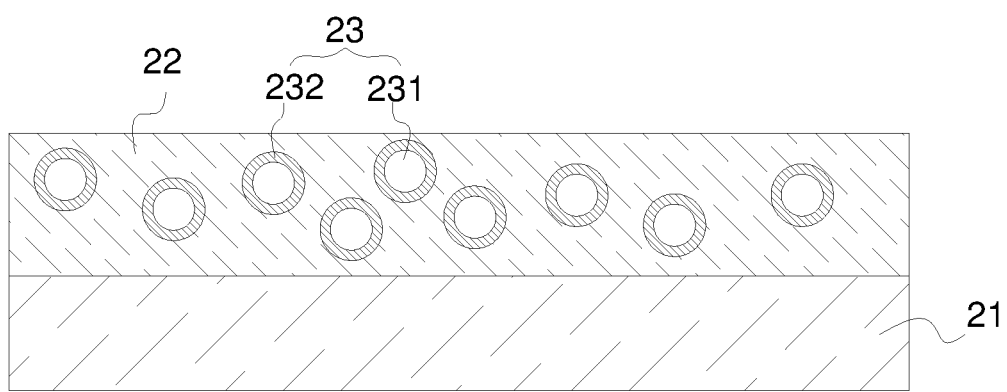
FIG. 5 is a cross-sectional view taken along line AA of FIG. 3.

Please refer to FIGS. 3-5. FIG. 3 is a schematic structural view of a color filter substrate according to an embodiment of the present application. FIG. 4 is a schematic structural view of a base substrate of a color filter substrate according to an embodiment of the present application. FIG. 5 is a cross-sectional view taken along line AA of FIG. 3. The present application also relates to a color film base substrate 200 including a base substrate 21 and a black matrix layer 22.

The base substrate 21 includes a plurality of first rough surfaces 211 and a plurality of second rough surfaces 212. The first rough surfaces 211 are spaced apart from each other along a first direction. The second rough surfaces 212 are spaced apart from each other along a second direction. The first rough surfaces 211 and the second rough surfaces 212 are disposed to intersect each other.

The black matrix layer 22 is disposed on the first rough surfaces 211 and the second rough surfaces 212.

The color filter substrate 200 of an embodiment of the present application increases a roughness of an interface between the black matrix layer 22 and the substrate 21 by performing a surface-roughening treatment on an area of the base substrate 21 where a black matrix 22 is disposed on. Reflectivity of the interface is thus reduced.

In some embodiments, the black matrix layer 22 defines a pore structure 23 in the black matrix layer 22. The pore structure 23 includes an air space 231 and a protective layer 232 that encapsulating the air space 231.

Because the pore structure 23 is provided with the air space therein, i.e., the protective layer 232 is filled with air, a refractive index of the pore structure 23 is close to a refractive index of air. Therefore, the refractive index of the black matrix layer 22 is lowered as a whole, thereby reducing the reflectivity of the interface between the black matrix layer 22 and the base substrate 21.

Compared with color film base substrates of the display panels of the prior art, the color film base substrate of the present application and the manufacturing method thereof increase a roughness of an interface between the black matrix layer and the substrate by performing a surface-roughening treatment on an area of the base substrate where a black matrix is disposed on. Reflectivity of the interface is thus reduced. The color film base substrate of the present application and the manufacturing method thereof solve the technical problem that light reflectivity of an interface between a black matrix of a color filter and a base substrate of conventional display panels is large.

In summary, one of ordinarily skill in the art can carry out changes and modifications to the described embodiment according to technical solutions and technical concepts of the present application, and all such changes and modifications are considered encompassed in the scope of protection defined by the claims of the present application.

The invention claimed is:

1. A manufacturing method of a color filter substrate, comprising steps of:
   providing a base substrate;
   forming a patterned photoresist layer on the base substrate, wherein the photoresist layer comprises a plurality of first grooves, a plurality of second grooves, and a plurality of photoresist structures, both the first grooves and the second grooves expose the base substrate, the first grooves are spaced apart from each other along a first direction, the second grooves are spaced apart from each other along a second direction, the first grooves and the second grooves intersect to form a plurality of photoresist regions, and the photoresist structures are disposed within the photoresist regions;
   roughening the base substrate to roughen bottom surfaces of the first grooves and bottom surfaces of the second grooves to form first rough surfaces and second rough surfaces, respectively;
   forming a black matrix layer on the base substrate, wherein the black matrix layer is disposed on and in direct contact with the first rough surfaces and the second rough surfaces; and
   removing the photoresist layer, wherein a material of the photoresist layer is a hydrophobic material and a material of the black matrix layer is a black ink material;
   forming a particle structure by encapsulating a mixture with a protective layer;
   mixing the particle structure into the black ink material; and
   wherein in the step of roughening the base substrate, the base substrate is roughened with a strong acid or a strong base.

2. The manufacturing method of the color filter substrate according to claim 1, wherein the black matrix layer is formed by inkjet printing.

3. The manufacturing method of the color filter substrate according to claim 1, wherein a viscosity of the black ink material is less than 10 cps.

4. The manufacturing method of the color filter substrate according to claim 1, wherein the strong acid is a hydrofluoric acid solution, and the strong base is a sodium hydroxide solution.

5. The manufacturing method of the color filter substrate according to claim 1, wherein the photoresist layer is formed by a photolithography process.

6. The manufacturing method of the color filter substrate according to claim 1, wherein a height of the black matrix layer is less than or equal to a height of the photoresist layer.

7. A manufacturing method of a color filter substrate, comprising steps of:
   providing a base substrate;
   forming a patterned photoresist layer on the base substrate, wherein the photoresist layer comprises a plurality of first grooves, a plurality of second grooves, and a plurality of photoresist structures, both the first grooves and the second grooves expose the base substrate, the first grooves are spaced apart from each other along a first direction, the second grooves are spaced apart from each other along a second direction, the first grooves and the second grooves intersect to form a plurality of photoresist regions, and the photoresist structures are disposed within the photoresist regions;

roughening the base substrate to roughen bottom surfaces of the first grooves and bottom surfaces of the second grooves to form first rough surfaces and second rough surfaces, respectively;

forming a black matrix layer on the base substrate, wherein the black matrix layer is disposed on and in direct contact with the first rough surfaces and the second rough surfaces, a material of the black matrix layer is a black ink material;

forming a particle structure by encapsulating a mixture with a protective layer;

mixing the particle structure into the black ink material; and removing the photoresist layer.

8. The manufacturing method of the color filter substrate according to claim 7, wherein a material of the photoresist layer is a hydrophobic material, and a material of the black matrix layer is a black ink material.

9. The manufacturing method of the color filter substrate according to claim 8, wherein the black matrix layer is formed by inkjet printing.

10. The manufacturing method of the color filter substrate according to claim 8, wherein a viscosity of the black ink material is less than 10 cps.

11. The manufacturing method of the color filter substrate according to claim 7, wherein in the step of roughening the base substrate, the base substrate is roughened with a strong acid or a strong base.

12. The manufacturing method of the color filter substrate according to claim 11, wherein the strong acid is a hydrofluoric acid solution, and the strong base is a sodium hydroxide solution.

13. The manufacturing method of the color filter substrate according to claim 7, wherein the photoresist layer is formed by a photolithography process.

14. The manufacturing method of the color filter substrate according to claim 7, wherein a height of the black matrix layer is less than or equal to a height of the photoresist layer.

15. A color film base substrate, comprising:

a base substrate comprising a plurality of first rough surfaces and a plurality of second rough surfaces, wherein the first rough surfaces and the second rough surfaces are disposed to intersect each other; and a black matrix layer disposed on and in direct contact with the first rough surfaces and the second rough surfaces, wherein a material of the black matrix layer is a black ink material, the material of the black matrix layer further comprises a particle structure that is mixed into the black ink material, and the particle structure comprises a mixture and a protective layer encapsulating the mixture.

16. The color filter substrate according to claim 15, wherein a pore structure is defined in the black matrix layer, and wherein the pore structure comprises an air space and the protective layer encapsulating the air space.

\* \* \* \* \*